UNITED STATES PATENT OFFICE.

LAURENCE BESSON, WIDOW OF THE LATE CLAUDE TIXIDRE, OF PARIS, FRANCE.

AUTOMATICALLY-LIGHTABLE CIGAR AND CIGARETTE.

1,089,308. Specification of Letters Patent. Patented Mar. 3, 1914.

No Drawing. Application filed October 16, 1912. Serial No. 726,156.

*To all whom it may concern:*

Be it known that I, LAURENCE BESSON, (widow of the late CLAUDE TIXIDRE,) a citizen of the French Republic, and resident of Paris, France, have invented certain new and useful Improvements in Automatically-Lightable Cigars and Cigarettes, of which the following is a specification.

The lighting substances used until to-day offer the drawback that, while burning, they separate from the cigars and the like and drop down, thus burning the carpets, clothes or other objects.

A further drawback of the device consists in that the rubbers used until now are not efficient, do not last very long neither are they of attractive appearance.

The object of the present invention is to do away with the above drawbacks.

The invention also consists in replacing the substances used until now in the manufacture of the paste serving for preparing the lighting pastil and proposed until now as a binding material for said pastil and for increasing the mass of the pastil in order to conveniently distribute the heat which is emitted while the pastil is lighted. Said substances are replaced by other ones which, when strongly heated, remain inactive or unchanged, that is to say which neither swell nor explode nor fuse nor vitrify.

For preparing the paste used for manufacturing rubbers, the substances used until now for providing the wanted roughness are, according to the present invention, replaced by substances such as powdered aluminium.

The invention further relates more especially to certain methods for putting into practice the above named means and still more especially to improved industrial products, viz. automatically lightable objects and rubbers for producing the ignition of said objects which constitute an application of said means.

The above is more fully explained hereinafter, in the following description showing one example of the improvement.

For manufacturing automatically lightable cigars and cigarettes for instance and rubbers for igniting said objects, the following substances may preferably be used in the following manner: In the first place, concerning the manufacture of the paste which is used for preparing the lighting pastil in combination with said cigars or the like, a convenient adhesive is first prepared which is composed as follows: water, 700 grams; gum tragacanth, 15 grams. The gum tragacanth is solved in cool water (which requires several days) and in said adhesive is introduced a suitable combustible ingredient which is conveniently made of chlorate of potassium 200 grams, and on the other hand a suitable combustible is added, viz: charcoal 100 grams, preferably prepared from white wood or preferably from tobacco. Said charcoal is pulverized in a grinder until it is reduced to an impalpable powder after which the mixture of the above mentioned substances is added to said charcoal powder and the new mixture thus obtained is submitted to the action of the grinder (which may be done without danger owing to the conditions of the chlorate of potassium in said mixture of the above mentioned substances) until said new mixture has become perfectly homogeneous (which lasts about a quarter of an hour). To said new mixture is added a substance which is provided with the above named qualities, for instance kaolin, chalk, tobacco pipe clay, or preferably, in view of its low specific weight, pumice stone and especially powdered pumice stone 450 grams. After the addition of this last substance the grinder is again put in action until a perfectly homogeneous half fluid mixture is obtained (which lasts for about a quarter of an hour). Then the manufacturing of the paste is finished and the paste may be used as usually, that is to say one end of the body to be lighted is dipped into the paste or the paste may be applied at the end of the body by means of a spatula. It is applied in such quantities and in such a manner onto the cigars, that it forms on said products a pastil which is solid or preferably perforated by means of a point and onto the free face of said pastil are applied several grains of chlorate of potassium.

Concerning now the manufacturing of the rubbers, one adds to an adhesive formed as above stated: amorphous phosphorus 100 grams, and powdered aluminium 35 grams. After mixing and when the effervescence produced by the mixture of the above substances is over, the rubbing surfaces, preferably a sheet of paper or the cigar sheath, are coated with said last mixture.

The products provided with the above described substances may be lighted without inconvenience, the combustion being positively performed without causing any dropping of the incandescent matter; the lighting is always positively secured and the rubbers manufactured according to the above process are not only more efficient, but also are of more attractive appearance.

Having now fully described my said invention, what I claim and desire to secure by Letters Patent, is:

A tip for the lighting of cigars, cigarettes or the like, composed of a mixture of adhesive and combustible ingredients, said ingredients consisting of gum tragacanth, potassium chlorate, tobacco charcoal powder, pumice-stone, and water.

In testimony whereof I have hereunto set my hand in presence of two witnesses.

LAURENCE BESSON,
VEUVE CLAUDE TIXIDRE.

Witnesses:
GASTON PETIAN,
HANSON C. COXE.

Copies of this patent may be obtained for five cents each, by addressing the "Commissioner of Patents, Washington, D. C."